(12) United States Patent
Escobar Olmos et al.

(10) Patent No.: US 10,228,993 B2
(45) Date of Patent: *Mar. 12, 2019

(54) DATA DUMP FOR A MEMORY IN A DATA PROCESSING SYSTEM

(71) Applicant: INTERNATIONAL BUSINESS MACHINES CORPORATION, Armonk, NY (US)

(72) Inventors: Victor Rafael Escobar Olmos, Boeblingen (DE); Jakob Christopher Lang, Boeblingen (DE); Angel Nunez Mencias, Boeglingen (DE); Albert Schirmer, Boeblingen (DE); Jochen Schweflinghaus, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 166 days.

This patent is subject to a terminal disclaimer.

(21) Appl. No.: 15/356,926

(22) Filed: Nov. 21, 2016

(65) Prior Publication Data

US 2017/0068587 A1  Mar. 9, 2017

Related U.S. Application Data

(63) Continuation of application No. 14/539,520, filed on Nov. 12, 2014, now Pat. No. 9,501,344.

(30) Foreign Application Priority Data

Nov. 28, 2013  (GB) .................................. 1321009.1

(51) Int. Cl.
*G06F 11/07* (2006.01)
*G06F 17/30* (2006.01)

(52) U.S. Cl.
CPC ...... *G06F 11/0778* (2013.01); *G06F 11/0706* (2013.01); *G06F 11/0727* (2013.01);
(Continued)

(58) Field of Classification Search
CPC ............. G06F 11/0778; G06F 11/0781; G06F 11/0787; G06F 11/1471; G06F 11/3476;
(Continued)

(56) References Cited

U.S. PATENT DOCUMENTS 6,175,917 B1  1/2001  Arrow et al.
7,594,139 B2  9/2009  Nellitheertha
(Continued)

OTHER PUBLICATIONS

Search Report under Section 17(5) for GB1321009.1 dated May 23, 2014, 3 pages.
(Continued)

*Primary Examiner* — Gabriel Chu
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

As the file system of an operating system program might be damaged by a crash, the file system is usually used neither for the selection of data to be dumped from a memory nor for the analysis of the dumped data, and all data contained in one or several areas of the memory are dumped. In order to preserve the integrity of the file system and enable its use after the crash, the memory is divided into a primary and a secondary memory section during a memory setup, file system data are transferred from the primary memory section to the secondary memory section widely out of the control of the operating system program, and a read access of a dump program is directed to the secondary memory section in order to select file system data to be dumped after the crash using error data.

20 Claims, 4 Drawing Sheets

(52) U.S. Cl.
CPC ...... *G06F 11/0751* (2013.01); *G06F 11/0781* (2013.01); *G06F 17/3007* (2013.01)

(58) Field of Classification Search
CPC ............. G06F 11/1417; G06F 11/1438; G06F 11/1441; G06F 11/2023; G06F 9/441
See application file for complete search history.

(56) References Cited

U.S. PATENT DOCUMENTS

| | | | |
|---|---|---|---|
| 7,818,616 | B2 | 10/2010 | Kathail et al. |
| 8,489,932 | B2 | 7/2013 | Hirata |
| 2003/0070110 | A1 | 4/2003 | Aija et al. |
| 2003/0188227 | A1 | 10/2003 | Maison et al. |
| 2005/0204107 | A1 | 9/2005 | Narayan et al. |
| 2006/0041739 | A1 | 2/2006 | Iwakura et al. |
| 2006/0085666 | A1 | 4/2006 | Stakutis et al. |
| 2006/0156057 | A1 | 7/2006 | Babu |
| 2008/0126879 | A1 | 5/2008 | Tiwari et al. |
| 2008/0133968 | A1 | 6/2008 | Muppirala et al. |
| 2008/0195836 | A1 | 8/2008 | Muppirala et al. |
| 2012/0102370 | A1 | 4/2012 | Yoshida et al. |
| 2012/0131380 | A1* | 5/2012 | Horman .............. G06F 11/1415 714/6.1 |
| 2014/0040671 | A1 | 2/2014 | Akirav et al. |
| 2014/0052691 | A1 | 2/2014 | Sasson et al. |
| 2014/0149799 | A1 | 5/2014 | Buendgen et al. |
| 2015/0149830 | A1 | 5/2015 | Escobar Olmos |
| 2015/0186203 | A1* | 7/2015 | Goyal ................. G06F 11/0778 714/45 |
| 2016/0266960 | A1* | 9/2016 | Moroo ................ G06F 11/0724 |
| 2017/0116096 | A1* | 4/2017 | Keremane ........... G06F 11/2069 |

OTHER PUBLICATIONS

Notice of Allowance for U.S. Appl. No. 14/539,520 dated Aug. 1, 2016, pp. 1-9.

Goyal, Vivek et al., "Kdump: Smarter, Easier, Trustier," (https://www.kernel.org/doc/ols/2007/ols2007v1-pages-167-178.pdf), Jun. 2007, pp. 167-178.

Goyal, Vivek et al., "Kdump: A Kexec Based Kernel Crash Dumping Mechanism," (http://lse.sourceforge.net/kdump/documentation/ols2005-kdump-presentation.pdf) 2005 (no further date information available), pp. 1-32.

\* cited by examiner

DATA DUMP FOR A MEMORY IN A DATA PROCESSING SYSTEM

This application is a continuation of co-pending U.S. Ser. No. 14/539,520, entitled "DATA DUMP FOR A MEMORY IN A DATA PROCESSING SYSTEM," filed Nov. 12, 2014, which claims priority from United Kingdom patent application number 1321009.1, filed Nov. 28, 2013, each of which is hereby incorporated herein by reference in its entirety.

BACKGROUND

One or more aspects of the present invention relate to a data dump for a memory in a data processing system.

Bugs in operating system routines of a data processing system can lead to the result that a data processing system ceases to function properly. This event is referred to as a crash. In order to continue using the data processing system, it must be re-booted. The main memory of the data processing system containing all crash information (i.e. any data that might be relevant to find out the cause of the crash) is a volatile memory. In order to establish the reason for the crash, the crash data is analyzed. However, this analysis cannot be performed by the data processing system before it is rebooted. Therefore, the crash information must be stored in a non-volatile memory of the data processing system or forwarded to another data processing system before the reboot. For this purpose, dump programs are used (programs that send crash information from the volatile memory to a further memory or data processing system).

Exemplary data processing systems making use of a non-volatile memory for the storing of the crash information are disclosed in U.S. Pat. No. 8,489,932, U.S. Pat. No. 7,818,616, and U.S. Pat. No. 7,594,139, each of which is incorporated by reference herein in its entirety. As diskless data processing systems have no non-volatile memory usable for the storing of the crash information, the crash information must be forwarded to another data processing system which stores the crash information before the reboot. Exemplary data processing systems forwarding the crash information to another data processing system are disclosed in U.S. Pat. No. 7,484,127 and U.S. Pat. No. 7,509,521, each of which is incorporated by reference herein in its entirety. In general, the forwarding of the crash information requires at least a functioning network device driver and protocol stack.

In combination with the operating system Linux, kdump is often used as a dump program which forms part of a data dump method for a memory in a data processing system, wherein a first area (startup area) of the memory contains code of an operating system program (Linux kernel) before a crash of the operating system program, wherein the operating system program is operable before the crash, wherein a second area (reserved area) of the memory contains code of an emergency operating system program and code of the dump program before the crash, wherein the code of the dump program and the code of the emergency operating system program in the second area are transferred to the first area after the crash, and wherein the dump program and the emergency operating system program are operable after the crash. Additionally, the first area contains a file system and the second area contains an initial file system (often referred to as initrd) before the crash. The codes of the dump program and the emergency operating system program in the reserved area are usually summarized and referred to as kdump kernel. If no order of instructions to be executed is specified as it is the case after a crash, instructions stored in the first area (startup area) are executed preferentially (before instructions stored in other areas of the main memory) due to the location of the first area (startup area). For this reason, the codes of the dump program, the operating system and the initial file system in the second area (reserved area) are exchanged with code in the first area (startup area) after a crash and thereupon automatically executed. When executed kdump dumps data in specified memory areas and does not select any files as the crash can result in a destruction of data which are part of the file system so that a selection of data using the file system may not be possible. Hence, the amount of data to be dumped might be relatively large. Furthermore the dump data might contain sensitive (confidential) information which should not be made available for analysis.

SUMMARY

According to one aspect of the present invention, a data dump method for a memory in a data processing system is provided. The memory is divided into a primary memory section and into a secondary memory section. The primary memory section includes a first area and a second area. The first area of the primary memory section of the memory contains code of an operating system program before a crash of the operating system program. The second area of the primary memory section contains code of an emergency operating system program and code of a dump program. The code of the dump program and the code of the emergency operating system program in the second area are transferred to the first area based on the crash. A read access of the dump program is directed to the secondary memory section based on the crash to select file system data to be dumped.

BRIEF DESCRIPTION OF THE DRAWINGS

A detailed description of one or more aspects of the invention is given in the following drawings in which.

DETAILED DESCRIPTION

Figure 1:
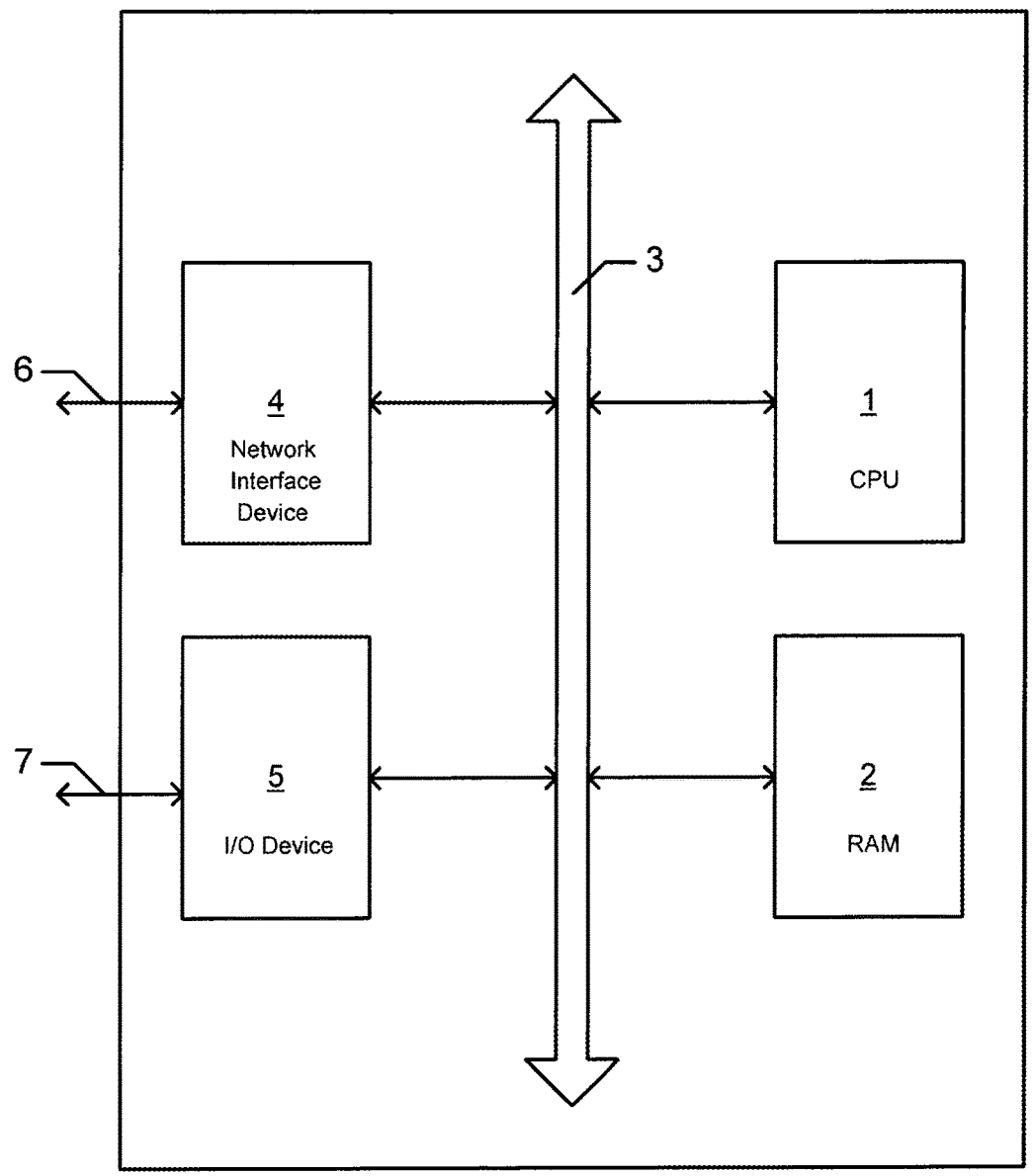
FIG. 1 shows one example of the architecture of a diskless computer.

FIG. 1 shows one example of the architecture of a diskless computer. The computer comprises several components including a CPU 1, a RAM 2, a bus 3, a network interface device 4, and an input/output device 5. The CPU 1, the RAM 2, the network interface device 4, and the input/output device 5 are directly connected to the bus 3 and can send data to other components of the computer and/or receive data from other components of the computer. The network interface device can receive and send data via a network connection 6. The input/output device 5 communicates with a keyboard, a mouse and a monitor (not shown) via the connection 7. The diskless computer is not necessarily a real machine, but can be a virtual machine or logical partition (LPAR). Accordingly, some or all of the components 1, 2, 3, 4, and 5 can be emulated components. In particular, the diskless computer might be a logical partition running on a mainframe computer like a mainframe computer of the IBM System z family. Such logical partitions have in general no non-volatile memory.

Figure 2A:
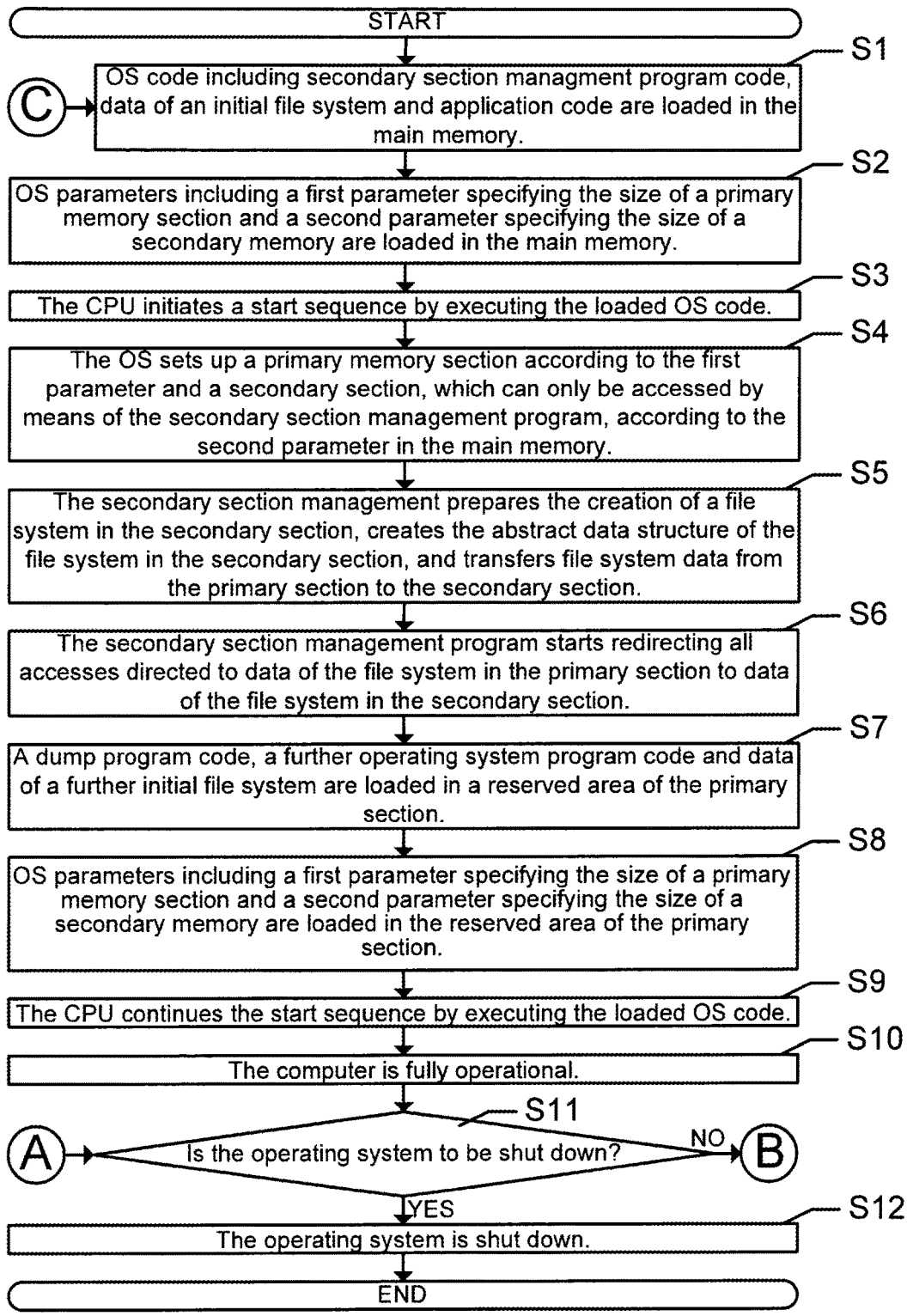
FIG. 2A shows a first part of one embodiment of an operation flowchart of the computer of FIG. 1.
Figure 2B:
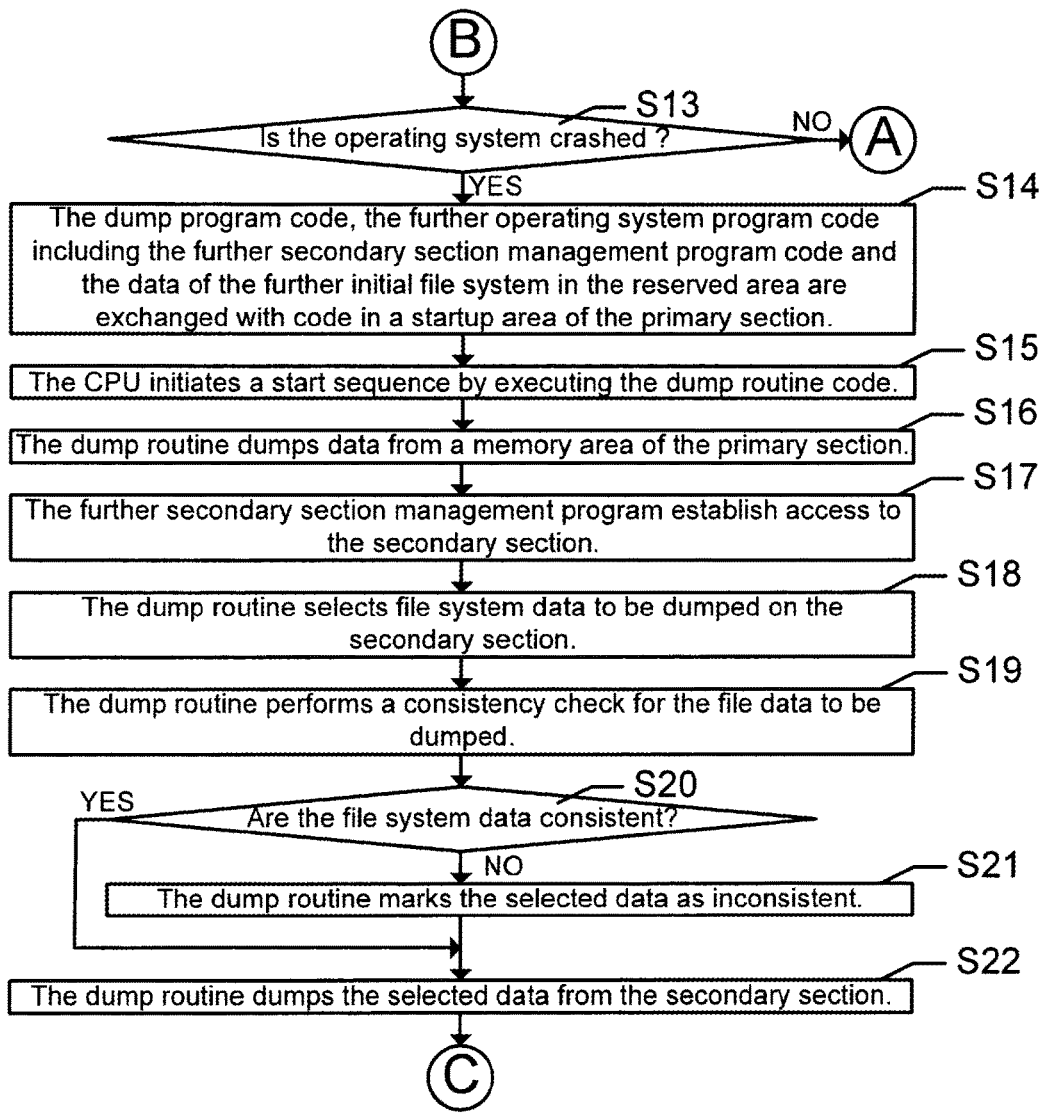
FIG. 2B shows a second part of one embodiment of an operation flowchart of the computer of FIG. 1.

FIG. 2A and FIG. 2B show a first part and a second part of one example of an operation flowchart of the computer of FIG. 1. Each step of the flowchart and combinations of steps in the flowchart can be implemented by computer program instructions. These computer program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart. These computer program instructions may also be stored in a computer readable medium that can direct a computer, other programmable data processing apparatus or other devices to function in a particular manner, such that the instructions stored in the computer readable medium produce an article of manufacture including instructions which implement the function/act specified in the flowchart. The computer program instructions may also be loaded onto a computer, other programmable data processing apparatus or other devices to cause a series of operational steps to be performed on the computer, other programmable apparatus or other devices to produce a computer implemented process such that the instructions which execute on the computer or other programmable apparatus provide processes for implementing the functions/acts specified in the flowchart. Each step in the flowchart may represent a module, segment, or portion of code, which comprises one or more executable instructions for implementing the specified logical function (s). It should also be noted that, in some alternative implementations, the steps may occur out of the order noted in the flowchart. For example, two steps shown in succession may, in fact, be executed substantially concurrently, or the steps may sometimes be executed in the reverse order, depending upon the functionality involved. It will also be noted that each step of the flowchart and combinations of steps in the flowchart can be implemented by special purpose hardware-based systems that perform the specified functions or acts, or combinations of special purpose hardware and computer instructions. The operation sequence shown in the flowchart comprises many features of an operation sequence of a typical logical partition running on a mainframe computer and using Linux as the operating system and kdump as the dump routine, wherein the mainframe computer might belong to the IBM System z family.

In step S1, operating system program code (e.g., code of the Linux kernel) including a secondary memory section management program code, data of an initial file system (e.g., initrd), and application program code are loaded in the main memory of the computer system via the network connection 4 (see FIG. 1). The operating system program comprises several operating system routines which manage hardware resources and provide services for the application programs. The application program code comprises several application routines which provide specific services. The initial file system is a temporary file system with data required for the boot process. The functioning of the secondary memory section management program which comprises several secondary memory section management routines is explained hereinafter in more detail. Apart from the operating system code being slightly different, step S1 is identical or analogous to a step for operating a logical partition run by a mainframe computer which might belong to the IBM System z. In contrast to the standard Linux operating system code, the operating system code comprises a memory setup routine adapted for the generation of a primary memory section to which the operating system program and application programs have the same access rights as the operating system routines and application routines to the main memory of a logical partition for standard Linux. Furthermore, the operating system code includes the secondary memory section management program code enabling the access to the secondary memory section.

In step S2, operating system parameters including a first parameter specifying the size of a primary memory section (e.g., 8 GB) and a second parameter specifying the size of a secondary memory section (e.g., 8 GB) are loaded in the RAM memory. Apart from there being the additional parameters, step S2 is identical or analogous to a step for operating a logical partition run by a mainframe computer which might belong to the IBM System z. As the primary memory section and the secondary memory section each cover contiguous address areas and are adjacent, the first parameters specify as well the start address of the secondary memory section.

In step S3, the CPU initiates a start sequence by executing the loaded operating system code. The start sequence includes the steps S3 to S9. Apart from the additional steps S4 to S8, the start sequence is identical or analogous to the start sequence of a logical partition run by a mainframe computer which might belong to the IBM System z. Some steps of the start sequence are performed before the steps S4 to S8. The part of the start sequence performed before steps S4 to S8 includes the creation of a file system in the primary memory section.

In step S4, the operating system sets up a primary memory section according to the first parameter and a secondary memory section according to the second parameter. The primary memory section can be accessed by operating system routines and application routines. The access to the secondary memory section is enabled by the secondary memory section management program.

In step S5, the secondary memory section management prepares the creation of a file system in the secondary memory section, creates the abstract data structure of the file system used to define files in the secondary memory section, and transfers file system data from the primary memory section to the secondary memory section. The transferred file system data includes user data (the data stored in the files of the file system) and metadata of files. The preparation of the creation of the file system can include the allocation of space in the secondary memory section. The file system created in the secondary memory section can include all files of the file system in the primary memory section. The file system in the primary memory section can be a standard Linux file system.

In step S6, the secondary memory section management program starts directing accesses to the data of file system in the secondary memory section. The accesses to data of the file system can be requested by operating system routines or application routines. The accesses would be directed to the file system in the primary memory section without the interference of the secondary memory section management program. The secondary memory section management program redirects the accesses to the data of the file system in the primary memory section to the data of the file system in the secondary memory section. The accesses directed to the secondary memory section can be read accesses or write accesses. Each write access directed to data of the file system of the primary memory section is redirected to the corresponding data of the file system in the secondary memory section. The write accesses can result in the modification, addition or deletion of data (files). In case of the modification or deletion of existing data, each write access directed to data of the file system of the primary memory section is redirected to the corresponding data of the file system in the secondary memory section. The accesses directed to the file system in the secondary memory section may include only write accesses. Read accesses of operating system routines or application routines might be directed to the file system in the primary memory section further on. Directing a write access to the file system in the secondary memory section means that data are, in one embodiment, directly written in the secondary memory section or written in the primary memory section and then copied to the secondary memory section. When data are directly written in the secondary memory section, the data can also be written in the primary memory section. The directing of read accesses to the secondary memory section in this step may only be required when write accesses are exclusively directed to the secondary memory section and not to the primary memory section.

In step S7, a dump program code, an emergency operating system program code and data of a further initial file system (e.g., initrd) are loaded in a reserved area of the primary memory section. The dump program code and the emergency operating system program code may be similar to a kdump kernel. However, the operating system program code differs from a standard Linux operating system code in an additional code of a further secondary memory section management program. The emergency operating system program code loaded in step S7 can be identical to the operating system code loaded in step S1. Usually, the code of the emergency operating system program loaded in step S7 comprises only the code of the most essential operating system routines which are required in connection with the dump program. Likewise, the data of the further initial file system (e.g., initrd) in step S7 usually only comprise the most essential data required in connection with dump routines. The further secondary memory section management program code loaded in step S7 can be identical to the secondary memory section program code loaded in step 1, but can differ from it substantially as the further secondary memory section management program implemented as code loaded in step S7 is to perform tasks other than the secondary memory section management program implemented as code loaded in step S1 as will be seen hereinafter.

In step S8, operating system parameters including a first parameter specifying the size of a primary memory section and a second parameter specifying the size of a secondary memory are loaded in the reserved section of the primary memory section. The first parameter and the second parameter loaded in step S8 are identical, in one embodiment, to the first and the second parameter loaded in step S2.

In step S9, the CPU continues the start sequence by executing the loaded operating system program code. Some steps of the start sequence are performed after the steps S4 to S8. The steps of the start sequence performed after the steps S4 to S8 may include any steps, in which the secondary memory section management program loaded in step 1 is concatenated with the operating system program and application programs.

In step S10, the computer is fully operational.

In step S11, the operating system checks whether it is to be shut down. E.g., the operating system may have to be shut down when a user enters a command to shut down the computer or logical partition using a keyboard or a mouse. This check is the same as for existing computers or logical partitions. If the operating system is to be shut down, step S12 is the next step. If the computer system is not to be shut down, step S13 (FIG. 2B) is the next step.

In step S12 (FIG. 2A), the computer is shut down. The shutdown is essentially identical or analogous to a shutdown of a normal computer or logical partition, wherein the additional secondary memory section management routines are taken into consideration.

In step S13 (FIG. 2A), it is checked whether the operating system program is crashed. An essentially identical or analogous check is performed for existing logical partitions or computers and does not have to be described in detail therefore. If the operating system program is crashed, step S14 is the next step. If the operating system program is not crashed, step S11 (FIG. 2A) is the next step.

In step S14, the dump program code, the emergency operating system program code including the further secondary memory section management program code, and the data of the further initial file system in the reserved area are exchanged with code in a startup area of the primary memory section. As the data exchange is similar to the data exchange of kdump, it does not have to be described in detail, wherein the exchanged data are different for an aspect of the present method as the data in the startup area and the reserved area include the code of two secondary memory section management programs.

In step S15, the CPU initiates a start sequence by executing the code transferred to the startup area in step S14. The start sequence includes the step S16. Apart from the additional step S16, the start sequence is, for instance, essentially identical or analogous to the start sequence performed for a logical partition using Linux and Kdump, wherein the logical partition might be running on a mainframe computer which might belong to the IBM System z after the detection of a crash, and wherein the division of the main memory in a primary memory section and a secondary memory section created in step S4 is maintained. The division is clearly defined by the first and second parameters. The primary memory section can be accessed by emergency operating system routines and application routines. The access to the secondary memory section is enabled by the further secondary memory section management program.

In step S16, the dump program dumps data from a memory area of the primary memory section. The dump program dumps all data in one or several memory areas of the primary memory section. An essentially identical or analogous data dump is typical of the kdump program. Therefore, the data dump which results in essentially the same output as the kdump program does not have to be described in detail, wherein the data dump in step 17 is limited to the primary memory section.

In step S17, the further secondary memory section management program establishes access to the secondary memory section. The establishment of the access to a memory section is known from the state of the art. Hence, further details do not have to be given. From now on, accesses requested by operating system routines of the emergency operating system program or application routines of the further application programs or dump program are directed to the file system in the secondary memory section. These accesses would be directed to the file system in the primary memory section without the interference of the secondary memory section management program. The further secondary memory section management program redirects the accesses to the file system in the primary memory section to the file system in the secondary memory section. The accesses directed to the secondary memory section can be read accesses or write accesses. Each read access directed to data of the file system of the primary memory section is redirected to the corresponding data of the file system in the secondary memory section. The accesses directed to the file system in the secondary memory section may include only read accesses. When a read access is directed to the file system in the secondary memory section data are (in one embodiment) directly read in the secondary memory section or might be copied from the secondary memory section to the primary memory section and then read in the primary memory section. Write accesses of operating system routines or application routines might be directed to the file system in the primary memory section further on. The directing of write accesses to the secondary memory section may not be necessary as the dump routine may perform only read requests.

In step S18, the dump program selects data in the secondary memory section to be dumped, wherein one or several read accesses of the dump program are directed to the secondary memory section. The secondary memory section contains an intact file system. Hence, the dump program is able to select the file system data to be dumped making use of information (e.g., metadata) concerning the data to be dumped. The metadata can be descriptive metadata, e.g. metadata containing information when the user data of a file were modified. The selected file system data may be data modified within a period before the crash. The selected file system data may be somehow related to the error code. The selected file system data may be somehow related to the error data. E.g., the error data may indicate that the error was caused by a specific routine, wherein the selected file system data may contain information about the execution of the specific routine.

In step S19, the dump routine performs a consistency check of the selected data in order to find out whether the selected data are corrupt or not. Such consistency checks are known from the state of the art. Hence, further details do not have to be given.

In step S20, the dump routine checks whether the selected file system data are consistent or not. If the selected file system data are not consistent, step S21 is the next step. If the selected file system data are consistent, step S22 is the next step.

In step 21, the dump program marks the selected file system data as being inconsistent. For this purpose, the dump program generates consistency check data referring to the selected file system data and indicating that the selected file system data are inconsistent.

In step 22, the dump program dumps the selected data from the secondary memory section. If the selected data are inconsistent, the dump program additionally dumps the consistency check data. When the data dump is finished, the operation method continues with step S1.

Figure 3:
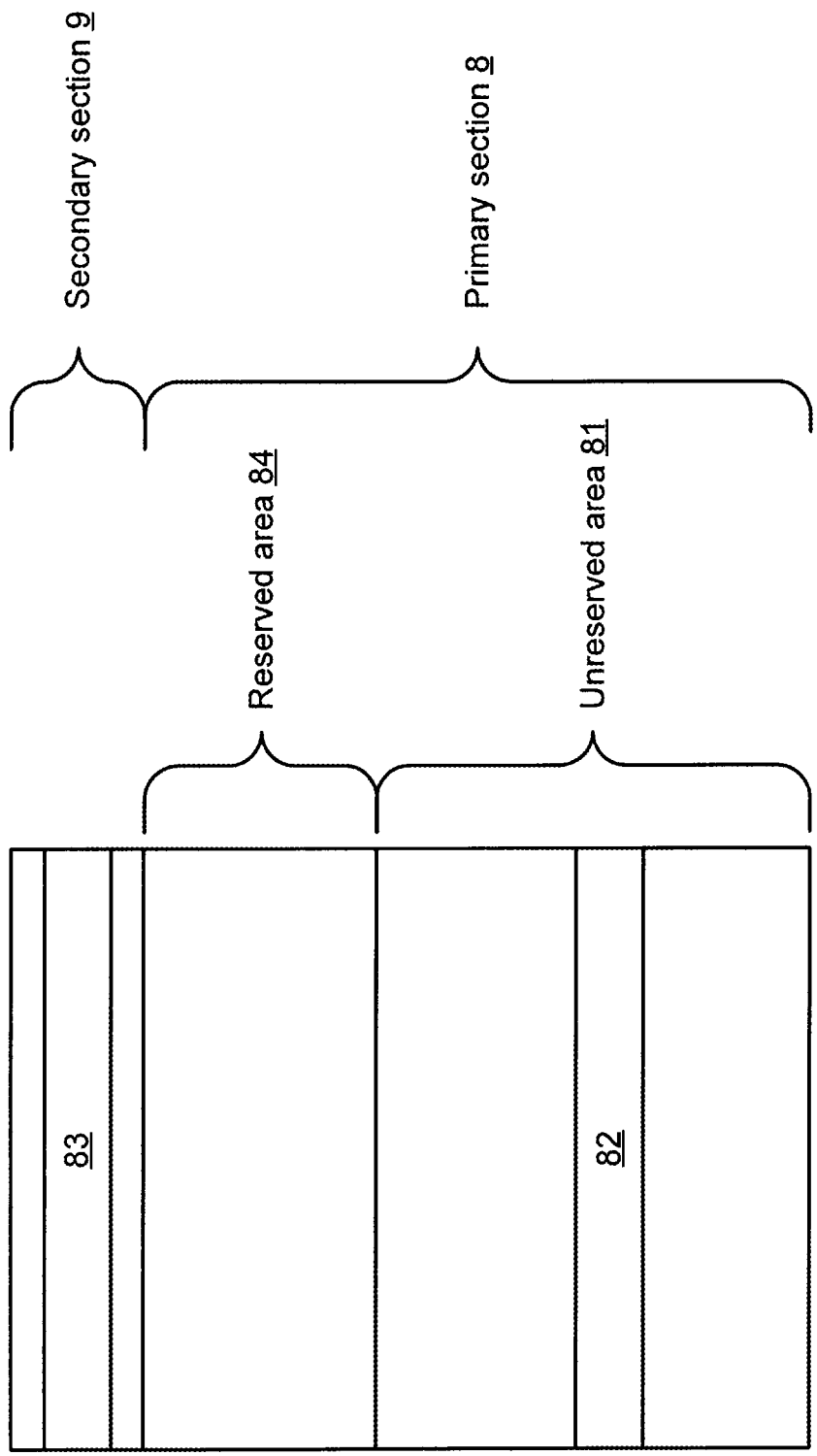
FIG. 3 shows one example of the allocation of the RAM memory of the fully operational computer of FIG. 1.

FIG. 3 shows one example of the allocation of the RAM memory of the fully operational computer of FIG. 1. The RAM memory comprises a primary memory section 8 and a secondary memory section 9. The primary memory section comprises a first area 81 (unreserved area) in which code of an operating system program and code of an application program are stored and which includes a file system data area 82 in which file system data are stored and a second area 84 (reserved area) in which the code of a dump routine, the code of an emergency operating system program and initial file system data are stored. A part of the area 81 forms the startup area mentioned before. When the operating system crashes, the data in the reserved area 84 are exchanged with data in the part of the area 81 which forms the startup area. The file system data in the file system data area 82 are transferred to a file system data area 83 in the secondary memory section 9 as explained before. Accesses of operating system routines or application routines directed to the file system data in the file system data area 82 of the primary memory section 8 may be directed to the file system data in the file system data area 83 in the secondary memory section of the secondary memory section 9.

As described herein, according to one aspect of the present invention, a data dump method for a memory in a data processing system is provided. A first area of the memory contains code of an operating system program before a crash of the operating system program. The operating system program is operable before the crash. A second area of the primary memory section contains code of an emergency operating system program and code of the dump program before the crash. The code of the dump program and the code of the emergency operating system program in the second area are transferred to the first area after the crash. The dump program and the emergency operating system program are operable after the crash. The memory is divided into a primary memory section and into a secondary memory section during a memory setup. The primary memory section comprises the first area and the second area. The secondary memory section is widely out of the control of the operating system program. First file system data are transferred from the primary memory section to the secondary memory section before the crash. A read access of the dump program is directed to the secondary memory section after the crash in order to select second file system data to be dumped.

In one embodiment, several read accesses of the dump program are directed to the secondary memory section in order to select second file system data to be dumped after the crash. The dump program uses error data for the selection.

In this context, the term "the secondary memory section is widely out of the control of the operating system program" means that one or several routines of the operating system program (in one embodiment, all routines apart from routines of a first and a second secondary management program) cannot (directly) perform read and write accesses on memory areas in the secondary memory section in normal operation (after the setup), wherein the routines of the operating system program might perform read and write accesses on memory areas in the secondary memory section by means of the first or the second secondary management program. In one embodiment, the secondary memory section is also widely out of the control of the one or several (in one embodiment, all) application programs and the dump program. The first file system data and the second file system data can be identical, but may be different.

In one embodiment, the first file system data are transferred from a primary file system data area in the primary memory section to a secondary file system data area in the secondary memory section. The data in the secondary memory section are protected against damaging by the crash as the operating system operates in the first memory section. In this context, a section can be a contiguous area of the memory or consist of several discontiguous areas of the memory. The memory can be a combination of several storage devices, wherein a section can comprise areas of several storage devices. In one embodiment, the memory is a volatile memory, e.g., a RAM memory.

In this context, file system data can include data defining a file system (e.g., data defining a file name or directory or a data structure or metadata associated with a file) and user data stored in files and managed by the file system, wherein a file is a container of user data. The metadata can be structural data or descriptive data. The file system data can belong to different file systems. In one embodiment, the file system data belong to a single file system, e.g., a standard Linux file system. In this context, the code of a program is the data defining the respective program, wherein the program is a collection of several routines. In this context, a routine is a sequence of instructions to perform a specific task when executed by the data processing system. The code can be in an executable or a non-executable form.

In this context, an operating system program manages computer hardware resources and provides common services for computer programs. In one embodiment, the operating system program is based on Linux and includes a Linux kernel or at least some routines of the Linux kernel. In one embodiment, the dump program may be part of kdump used in context with Linux or includes at least some routines of kdump. In one aspect of the present invention, the operating system program used in combination with the dump program is not defined as a component of the dump program. For this reason, the dump program cannot be identical to kdump comprising basic Linux operating system routines.

In this context, the first and the second area can be contiguous areas of the memory or consist of several discontiguous areas of the memory. The first area can be a startup area, wherein instructions stored in the startup area are executed, e.g., preferentially (before instructions stored in other areas of the main memory) due to the location of the startup area. The second memory area can be an area (reserved area) reserved for storing the emergency operating system program and the code of the dump program. The second area can be located within the first area surrounded by memory cells belonging to the first area or adjacent to the first area. An emergency operating system program is an operating system program used in case of an emergency (e.g., crash of the operating system program). In one embodiment, the emergency operating system program operates in the primary memory section. In one embodiment, the secondary memory section is widely out of the control of the emergency operating system program.

In this context, error data are data comprising information about the crash, e.g., an error code. The error data may be generated by the operating system program. The second file system data may be somehow related to the error data. E.g., the error data may indicate that the error was caused by a specific routine, wherein the second file system data may contain information about the execution of the specific routine. The error data may either be stored as file system data in the primary or secondary file system data area. In one embodiment, the second file system data form one or several files.

Aspect of the invention can take the form of an entirely hardware embodiment, an entirely software embodiment (including firmware, resident software, micro-code, etc.) or an embodiment combining software and hardware aspects that may all generally be referred to herein as a "circuit", "module" or "system".

In one embodiment, a write access of the operating system program is directed to the secondary memory section by means of a first secondary memory section management program. For instance, the write access of the operating system program is directed to a secondary file system data area in the secondary memory section. In one embodiment, the write access is performed while the first area contains the code of the first secondary memory section management program. The first secondary memory section management program can be defined as a module of the operating system program and may be referred to as the first memory management subprogram for this reason.

In a further development of one embodiment, the operating system program writes a new file in the secondary memory section (e.g., the secondary file system data area in the secondary memory section) by means of the first secondary memory section management program.

In yet another further development of one embodiment, the operating system program overwrites data of a file in the secondary memory section (e.g., the secondary file system data area in the secondary memory section) by means of the first secondary memory section management program.

In yet another embodiment, the read access of the dump program is directed to the secondary memory section (e.g., the secondary file system data area in the secondary memory section) by means of a second secondary memory section management program. In one embodiment, several read accesses of the dump program are directed to the secondary memory section by means of the second secondary memory section management. In one embodiment, the read access (es) is (are) performed after the transfer of the code of the second secondary memory section management program from the second area to the first area.

In yet another embodiment, a read access of the emergency operating system program is directed to the secondary file system data area after the transfer of the code of the emergency operating system program from the first area to the second area. The directing of the read access could be performed by the second secondary memory section management program after the transfer of the code of the second secondary memory section management program from the second area to the first area. The second secondary memory section management program can be defined as a module of the emergency operating system program and may be referred to as the second memory management subprogram for this reason.

In yet another further development of one embodiment, the first file system data are transferred from the primary memory section to the secondary memory section by means of the first secondary memory section management program.

In yet another embodiment, the dump program performs a consistency check of the second file system data in the secondary memory section (e.g., the secondary file system data area in the secondary memory section) before the dump program dumps the second file system data. The check ensures that only consistent data are dumped. The dump program may also perform several consistency checks for different fractions of file system data to be dumped, wherein the dump program may dump each fraction separately. The dump program may generate consistency check data referring to the file system data for which a consistency check was performed and indicating that the file system data are inconsistent. If the selected data were inconsistent, the dump program could dump the consistency check data additionally.

In yet another embodiment, the dump program selects one or several files as the second file system data. In one example, the second file system data consists of one or several files. The selection of one or several files is possible as a result of the integrity of the file system in the secondary memory section.

In yet another embodiment, the dump program uses metadata in order to select the second file system data to be dumped from the secondary memory section. The metadata can be descriptive metadata, e.g. metadata containing information when the user data of a file was modified. The second file system data may be data modified within a period before the crash. In one embodiment, the second file system data form one or several files.

In yet another embodiment, the memory setup is part of a start sequence process of the operating system program. In one example, a first parameter and a second parameter specifying the size of the primary memory section and the secondary memory section are used in the memory setup. In one embodiment, the first parameter additionally indicates the start address of the secondary memory section.

In yet another embodiment, the code of the dump program and the code of the emergency operating system program in the second area are exchanged with data in the first area. The data in the first area can comprise at least a part of the code of the operating system program. Thus, no data are lost due to the transfer of the first file system data from the primary memory section to the secondary memory section before the crash. The features of this embodiment are similar to the features typical of kdump. Alternatively, data of the operating system program which is operational before the crash may be partially or completely overwritten when the code of the emergency operating system program and the code of the dump program are transferred from the second area to the first area in case of a crash of the operating system program.

In general, the data dump method can comprise any possible combination of features of the embodiments and further developments.

According to a second aspect of the present invention, a data processing system with a memory is provided. A first area of the memory contains code of an operating system program. A second area of the memory contains code of an emergency operating system program and code of a dump program. The memory is divided into a primary memory section and into a secondary memory section. The primary memory section comprises the first area and the second area. The secondary memory section is widely out of the control of the operating system program. The first area contains code of a first secondary memory section management program. The second area contains code of a second secondary memory section management program. The first secondary memory section management program is adapted to transfer first file system data from the primary memory section to the secondary memory section before a crash of the operating system program. The second secondary memory section management program is adapted to direct a read access of the dump program to the secondary memory section after the crash and a transfer of the code of the emergency program, the code of the dump program and the code of the second secondary memory section management program from the second area to the first area in order to select second file system data to be dumped. The dump program is adapted to use error data for the selection.

In one aspect, the first secondary memory section management program directs one or several accesses of the operating system routine to the file system data in the secondary memory section. In one embodiment, the second secondary memory section management program directs one or several accesses of the dump program to the file system data in the secondary memory section after the transfer of the code of the second secondary memory section management program, the emergency operating system program, and the dump program from the second area to the first area. The transfer mechanism may be similar to the transfer mechanism known from Linux in combination with kdump. This known transfer mechanism may be adapted for the transfer of different and/or further data.

In this context, a data processing system is a system that produces a defined set of outputs for a set of inputs. A data processing system suitable for storing and/or executing program code will include at least one processor coupled directly or indirectly to memory elements through a system bus. The memory elements can include local memory employed during actual execution of the program code, bulk storage and cache memories which provide temporary storage of at least some program code in order to reduce the number of times code is to be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters. The data processing system may be embodied as a virtual data processing system (virtual machine) or logical partition (LPAR) running on a mainframe computer and the like. However, even in the case that the management method is performed by a virtual machine or logical partition, the term "data processing system" can refer to the host machine on which the virtual machine or logical partition is running.

According to a third aspect of the present invention, a data processing program for execution in a data processing system with a memory is provided. A first area of the memory contains code of an operating system program. A second area of the memory contains code of an emergency operating system program and code of a dump program. The memory is divided into a primary memory section and into a secondary memory section, wherein the primary memory section comprises the first area and the second area, wherein the secondary memory section is widely out of the control of the operating system program, wherein the first area contains code of a first secondary memory section management program, wherein the second area contains code of a second secondary memory section management program, wherein the first secondary memory section management program is adapted to transfer first file system data from the primary memory section to the secondary memory section before a crash of the operating system program, wherein the second secondary memory section management program is adapted to direct a read access of the dump program to the secondary memory section after the crash and a transfer of the code of the emergency program, the code of the dump program and the code of the second secondary memory section management program from the second area to the first area in order to select second file system data to be dumped, and wherein the dump program is adapted to use error data for the selection when the data processing program is run on the data processing system.

According to a fourth aspect of the present invention, a computer program product for performing a data dump from a memory of a data processing system is provided. A first area of the memory contains code of an operating system program. A second area of the memory contains code of an emergency operating system program and code of a dump program. The computer program product comprises a computer readable storage medium having program code embodied therewith, to perform a method comprising:
dividing the memory into a primary memory section and into a secondary memory section during a memory setup, wherein the primary memory section comprises the first area and the second area, wherein the secondary memory section is widely out of the control of the operating system program, transferring first file system data from the primary memory section to the secondary memory section before the crash, and directing a read access of the dump program to the secondary memory section after the crash in order to select second file system data to be dumped, wherein the dump program uses error data for the selection.

The storage medium can be any combination of one or more computer readable medium(s). For the purposes of this description, a computer-usable or computer readable medium can be any apparatus that can contain, store, communicate, propagate or transport the program for use by or in connection with the instruction execution system, apparatus or device. The computer readable medium may be a computer readable signal medium or a computer readable storage medium.

A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate or transport a program for use by or in connection with an instruction execution system, apparatus or device. Program code embodied in a computer readable medium may be transmitted using any appropriate medium, including but not limited to wireless, wireline, optical fibre cable, RF, etc. or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an internet service provider).

In general, the data processing system, data processing program, and the computer program product according to aspects of the invention can comprise any possible combination of features enabling the execution of the embodiments of the data dump method according to aspects of the invention.

What is claimed is:

1. A data dump method for a memory in a data processing system, said data dump method comprising:
    dividing said memory into a primary memory section and a secondary memory section, wherein said primary memory section comprises a first area and a second area, wherein the first area of said primary memory section contains code of an operating system program before a crash of said operating system program, and wherein the second area of said primary memory section contains code of an emergency operating system program and code of a dump program, wherein said code of said dump program and said code of said emergency operating system program in said second area are transferred to said first area based on said crash, and wherein said dump program and said emergency operating system program are operable after said crash; and
    directing a read access of said dump program to said secondary memory section, based on said crash, to select file system data to be dumped.

2. The data dump method according to claim 1, wherein said dump program uses error data to select the file system data to be dumped.

3. The data dump method according to claim 1, further comprising directing a write access of said operating system program to said secondary memory section.

4. The data dump method according to claim 3, further comprising writing by said operating system program a new file in said secondary memory section.

5. The data dump method according to claim 1, further comprising transferring chosen file system data from said primary memory section to said secondary memory section before said crash.

6. The data dump method according to claim 1, further comprising performing by said dump program a consistency check of said file system data in said secondary memory section before said dump program dumps said file system data.

7. The data dump method according to claim 1, wherein said file system data comprises one or more files.

8. The data dump method according to claim 1, wherein said dump program uses metadata to select said file system data to be dumped from said secondary memory section.

9. The data dump method according to claim 1, wherein the dividing said memory is performed during a memory setup, and wherein said memory setup is part of a start sequence of said operating system program.

10. The data dump method according to claim 1, wherein said code of said dump program and said code of said emergency operating system program in said second area are exchanged with data in said first area of said primary memory section.

11. A system comprising:
    a memory; and
    a processor in communication with the memory, wherein the computer system is configured to perform a method, said method comprising:
        dividing said memory into a primary memory section and a secondary memory section, wherein said primary memory section comprises a first area and a second area, wherein the first area of said primary memory section contains code of an operating system program before a crash of said operating system program, and wherein the second area of said primary memory section contains code of an emergency operating system program and code of a dump program, wherein said code of said dump program and said code of said emergency operating system program in said second area are transferred to said first area based on said crash, and wherein said dump program and said emergency operating system program are operable after said crash; and directing a read access of said dump program to said secondary memory section, based on said crash, to select file system data to be dumped.

12. The system according to claim 11, wherein said dump program uses error data to select the file system data to be dumped.

13. The system according to claim 11, wherein said dump program uses metadata to select said file system data to be dumped from said secondary memory section.

14. The system according to claim 11, wherein the method further comprises performing by said dump program a consistency check of said file system data in said secondary memory section before said dump program dumps said file system data.

15. The system according to claim 11, wherein said code of said dump program and said code of said emergency operating system program in said second area are exchanged with data in said first area of said primary memory section.

16. A computer program product comprising:

a non-transitory computer readable storage medium readable by a processing circuit and storing instructions for execution by the processing circuit for performing a method comprising:

dividing memory into a primary memory section and a secondary memory section, wherein said primary memory section comprises a first area and a second area, wherein the first area of said primary memory section contains code of an operating system program before a crash of said operating system program, and wherein the second area of said primary memory section contains code of an emergency operating system program and code of a dump program, wherein said code of said dump program and said code of said emergency operating system program in said second area are transferred to said first area based on said crash, and wherein said dump program and said emergency operating system program are operable after said crash; and directing a read access of said dump program to said secondary memory section, based on said crash, to select file system data to be dumped.

17. The computer program product according to claim 16, wherein said dump program uses error data to select the file system data to be dumped.

18. The computer program product according to claim 16, wherein said dump program uses metadata to select said file system data to be dumped from said secondary memory section.

19. The computer program product according to claim 16, wherein the method further comprises performing by said dump program a consistency check of said file system data in said secondary memory section before said dump program dumps said file system data.

20. The computer program product according to claim 16, wherein said code of said dump program and said code of said emergency operating system program in said second area are exchanged with data in said first area of said primary memory section.

* * * * *